Patented June 1, 1954

2,680,105

UNITED STATES PATENT OFFICE 2,680,105

SELF-EXTINGUISHING COMPOSITION FROM CHLORINE CONTAINING ALKYDS AND ANTIMONY TRIOXIDE

Theodore C. Baker, Toledo, Ohio, assignor, by mesne assignments, to Allied Chemical & Dye Corporation, New York, N. Y., a corporation of New York No Drawing. Application September 28, 1951, Serial No. 250,181

12 Claims. (Cl. 260—39)

The invention relates to a novel synthetic resin composition that produces self-extinguishing articles which are stable at service temperatures.

Synthetic resin compositions are being used commercially in ever-increasing volume. However, synthetic resins are organic substances, and when contacted by a flame they tend to generate combustible gases. For example, articles molded from unsaturated alkyd resin molding compositions usually ignite and burn readily when contacted by a flame. Thus, there is an important need for a synthetic resin composition that produces self-extinguishing articles, i. e., articles which, although they may burn when held in a strong flame, will not continue to burn after the flame has been withdrawn and will not permit the flame to propagate and spread on the article itself. In commercial practice, the property of being self-extinguishing is considered to be necessary in order to render articles acceptable for industrial applications in which there is a possibility of the articles being exposed momentarily to an arc or other flame.

The principal object of the invention is to provide a novel synthetic resin composition which produces self-extinguishing articles that are stable at service temperatures. More specific objects and advantages are apparent from the description, which illustrates and discloses but is not intended to limit the scope of the invention.

Methods of increasing the flame resistance of wood, textiles and paints are known, but such methods ordinarily cannot be used in the treatment of a synthetic resin composition to cause articles made from the composition to be self-extinguishing.

For example, methods that are designed for increasing the flame resistance of cellulosic materials such as wood or cotton textiles frequently are not applicable to synthetic resin compositions that contain no more than a minor proportion of cellulose.

Moreover, the commonly used water-soluble flame retardants such as ammonium phosphates or borates cannot be incorporated in synthetic resin compositions because of their effect in destroying the water resistance and electrical properties of articles made from the compositions.

In fact, it may be stated as a general proposition that ingredients incorporated in a synthetic resin composition to render the articles self-extinguishing must be effective in small proportions, because amounts as large as the amounts of flame-retarding ingredients used for paints or textiles could not be used in a synthetic resin composition without seriously impairing properties such as strength or water resistance that are essential in order to make the articles commercially useful.

The flame-resistant ingredients that can be used in a textile, paint or wood product may not be sufficiently stable to be usable in a cast or molded article, because the temperatures to which the article is exposed in service are substantially higher than any temperatures to which the former products are exposed. Thus, the combination of chlorinated paraffins with antimony trioxide, which has been most commonly used in flame-proofing heretofore, cannot be employed in an unsaturated alkyd composition, because the decomposition reaction that is intended to extinguish or retard the flame actually takes place at the temperatures encountered by the articles in service, so that the presence of such flame-proofing ingredients renders the articles unsatisfactory by reason of rapid deterioration during service.

Finally, the flame-proofing treatment heretofore known usually have consisted in the application of protective coatings. The problem of formulating a synthetic resin composition to cause articles made from the composition to be self-extinguishing is a problem quite different from the problem of providing a flame-resistant coating, because the entire composition must be rendered self-extinguishing without the benefit of any flame-resistant coating. The problem of producing a flame-resistant coating is relatively simple because the coating may consist almost entirely of flame resistant ingredients, whereas a synthetic resin composition must contain a large proportion of combustible organic material and only a small proportion of flame-resistant ingredients.

The problem of treating a synthetic resin composition to cause articles made from the composition to be self-extinguishing is a vastly different problem with different compositions. In the case of unsaturated alkyd resin compositions, the problem of rendering the articles self-extinguishing is particularly difficult because of the fact that the alkyd resin contained in such compositions burns readily, and decomposes rapidly into inflammable gases when heated strongly. Moreover, such compositions ordinarily contain monomers such as diallyl phthalate, and the presence of such monomers makes it even more difficult to render the articles self-extinguishing.

A composition embodying the invention, which produces self-extinguishing articles that are stable at service temperatures, comprises (1) antimony trioxide and (2) a polymerizable unsaturated alkyd wherein not less than 20 per cent of the acid groups are polymerizably reactive $\Delta^{2,3}$-enedioyl groups, said composition containing acid groups having chlorinated benzene nuclei whose chlorine content is at least 6 per cent by weight of the organic substances in the composition.

An unsaturated alkyd resin is essentially a reaction product of an unsaturated acid such as maleic or fumaric acid with a glycol. It is the unsaturated character of the resin that enables the resin to polymerize and harden to the desired infusible state during the fabricating operation, and it is the unsaturated acid component of the resin that provides the necessary polymerizably reactive olefinic double bonds in the resin molecules. Thus, when a saturated dibasic acid is used along with the unsaturated dibasic acid, for reaction with a glycol in the production of an unsaturated alkyd resin, such saturated dibasic acid must be used only in a minor proportion because every molecule of saturated dibasic acid that is used takes the place of a molecule of the essential unsaturated dibasic acid.

Thus, saturated dibasic acids have been used in the production of unsaturated alkyd resins, but always as minor ingredients, and chlorosubstituted phthalic acids are among the various saturated dibasic acids that have been so used. The present invention is based upon the discovery that although antimony trioxide, when added to an ordinary unsaturated alkyd composition, does not improve the flame resistance of articles made from the composition, the addition of antimony trioxide results in articles having remarkable self-extinguishing properties if chlorophthalate groups are present in the composition in sufficient amount so that such groups provide a chlorine content in the composition that is above a certain critical minimum value. In accordance with the present invention it has been discovered further that although the chlorophthalate groups in the present composition are extremely stable as compared with chlorinated paraffins and show no decomposition whatever at fabricating or service temperatures, they nevertheless decompose readily when the articles are exposed to a flame, to provide a very effective self-extinguishing action.

It was not known heretofore that chlorophthalate groups would readily give up their chlorine content in the necessary critical temperature range that is above the fabricating and service temperatures of unsaturated alkyd compositions and yet is not above the temperature to which the material is heated when the articles are exposed to a flame, and it was not known that the liberation of such chlorine would take place so effectively, in the presence of antimony trioxide, as to render the articles self-extinguishing even though the chlorophthalate content that it is possible to use in an unsaturated alkyd composition is quite limited. In the practice of the present invention, the chlorophthalate content that is used is in the critical range above the chlorophthalate content that provides the critical minimum chlorine content that has been discovered to render the articles self-extinguishing, and below the maximum chlorophthalate content that can be used without seriously impairing other properties of the articles.

The unique stability at service temperatures of the chlorophthalate content of a composition embodying the invention as compared with the instability of the chlorine donors heretofore used, and the ineffectiveness of antimony trioxide when used alone, have been demonstrated as follows:

A composition embodying the invention was prepared as follows: A polymerizable unsaturated alkyd was prepared as follows: A mixture of 0.8 mol of ethylene glycol and 0.2 mol of propylene glycol with 0.8 mol of maleic anhydride and 0.2 mol of tetrachlorophthalic anhydride and an amount of hydroquinone equal to 0.06 per cent by weight of the charge was placed in a 3-necked flask fitted with a thermometer, a tube leading to a condenser and an inlet tube through which was introduced a moderate steam of carbon dioxide. The mixture was heated in an oil bath at a temperature of about 175 degrees C. for one hour. The mixture was then heated at 230 to 235 degrees C. for about three hours to obtain an alkyd having an acid number of about 23.7. The alkyd (1168 parts) and diallyl phthalate (130 parts) were mixed in a Banbury mixer with "Luperco ATC" catalyst (a paste consisting of 26 parts of tricresyl phosphate and 26 parts of benzoyl peroxide); a filler consisting of a mixture of kaolin (1575 parts) and anthophyllite fibers (1575 parts); a lubricant (100 parts of zinc stearate); a metal base (250 parts of barium carbonate); and antimony trioxide (250 parts). The mixing was continued until a soft, homogeneous dough was obtained. The material was then passed through warm rubber rolls to form sheets of a thickness of approximately ⅛ inch. The sheets were allowed to solidify fully while at a temperature between 80 and 90 degrees F. and were then granulated in a high speed cutter to a maximum particle diameter of about ⅛ inch. This granular molding composition of the invention is referred to in the tests described below as composition A.

For the sake of comparison, a control composition was prepared by the procedure described above except that in the preparation of the unsaturated alkyd, phthalic anhydride (0.2 mol) was used in place of the tetrachlorophthalic anhydride and an additional ingredient (250 parts of "Chlorowax 70," a chlorinated paraffin resin of the approximate average formula $C_{24}H_{29}Cl_{21}$, containing 70 per cent by weight of chlorine) was also incorporated in the composition. This control composition is referred to in the tests described below as composition B.

A second control composition was prepared by the procedure described for the preparation of composition A, except that (1) in the preparation of the unsaturated alkyd, phthalic anhydride (0.2 mol) was used in place of the tetrachlorophthalic anhydride; (2) the following proportions of ingredients were employed: 140 parts of the unsaturated alkyd, 15.6 parts of diallyl phthalate, 6.2 parts of "Luperco ATC" catalyst, 189 parts of kaolin, 189 parts of anthophyllite, 30 parts of barium carbonate, 12 parts of zinc stearate, and 30 parts of antimony trioxide; and (3) an additional ingredient (30 parts of "Geon 200X20," a polyvinyl chloride) was also incorporated. This control composition is referred to in the tests described below as composition C.

Samples of compositions A, B and C were compression molded at a temperature of about 300 degrees F. to produce bars of dimensions 6 inches x ½ inch by ¼ inch. The stability at service temperatures of these test pieces was determined by measuring their retention of insulation resistance, upon exposure to extreme conditions of temperature and humidity, before and after aging at 150 degrees C. for 30 days. (The term "service temperatures" is used herein to mean the temperatures which a fabricated article might have to withstand in use. The use of a temperature of 150 degrees C. makes for a very strenuous test, most articles never having to withstand such a high temperature in use.) The greater the retention of insulation resistance after aging at 150 degrees C. for 30 days, the greater is the stability of the molded article at service temperatures.

Insulation resistance is determined by measuring the resistance (in megohms) offered to the flow of a current when a voltage is impressed between two electrodes so embedded in a molded article that there is a distance of 1¼ inches between the centers of the electrodes. In order to accelerate the test, the compositions were exposed to high relative humidities and high temperatures to promote the breakdown of their insulation resistance. (The initial insulation resistance of each sample tested before exposure to humid conditions was over one million megohms.) The insulation resistance test results shown in column 2 of the table were obtained on a test bar of each composition exposed to a temperature of 160 degrees F. and a relative humidity of 95 per cent for one day. The insulation resistance test results shown in column 3 of the table were obtained on a second test bar of each composition held in an oven at 150 degrees C. for 30 days before it was exposed to a temperature of 160 degrees F. and a relative humidity of 95 per cent for one day and tested for insulation resistance.

TABLE

| Composition | Insulation Resistance (in megohms) After Exposure for One Day at 160 degrees F., 95 percent Relative Humidity | |
| --- | --- | --- |
| | (Before Aging) | (After Aging) |
| A | 125 | 12,500 |
| B | 95 | [1] 0.25 |
| C | 190 | (²) |

[1] Sample darkened badly.
[2] Sample darkened badly and decomposed during aging.

As the results in the table indicate, the compositions which comprise chlorinated paraffins or polyvinyl chloride (control compositions B and C) are deteriorated severely by elevated temperatures such as may be encountered in service. The composition which comprises a tetrachlorophthalate as a flame-proofing agent (composition A of the invention), on the other hand, actually shows an improvement as a result of aging at elevated temperatures.

Yet, despite the fact that a composition of the invention which comprises chlorophthalyl radicals as a chlorine donor is considerably more stable at service temperatures than compositions which comprise one of the chlorine donors heretofore used, a composition of the invention gives up its chlorine at such a temperature as to cause the composition to be flame resistant, i. e., to be self-extinguishing. For example, a molded bar of composition A of the invention was tested for flammability by a modification of the test prescribed by the Underwriters' Laboratories. (Many interrelated factors are involved in the phenomenon of being self-extinguishing, among them the chemical composition of a sample, its size and shape, the method of mounting the sample, the rate of heat input, the duration of heating, the ignition temperature, the thermal insulating properties of the sample, the temperature build up, the rate of decomposition to gaseous products and the volume and nature of the gaseous products formed. Thus, different test methods may lead to somewhat different flammability results.) The test used on the molded bar of composition A was more severe than many other test methods. This test consisted in mounting the molded bar in a vertical position, and subjecting the lower end of the bar to the direct flame of a Bunsen burner for 30 seconds. The burner flame was adjusted to a height of about 5 inches, with the blue cone adjusted to a height of 1½ inches and with the bottom of the test piece at the tip of the blue cone. After 30 seconds the flame was withdrawn and the time for natural extinguishing of the test piece was noted. If the test piece continued to burn, it was rated as "not self-extinguishing." If it did not continue to burn, the burner flame was immediately applied for 30 seconds more, and the behavior of the test piece was again noted after withdrawal of the burner. When a test piece molded from composition A of the invention was tested for flammability in that manner, it stopped burning within 10 seconds after the flame was removed upon the first ignition, and within 30 seconds after the flame was removed upon the second ignition. A test piece molded from a composition which comprised antimony trioxide but no chlorophthalate, on the other hand, when thus tested for flammability continued to burn until it was consumed and was not self-extinguishing. (The latter composition was prepared as follows: A polymerizable binder consisting of 140.2 parts of a polymerizable unsaturated alkyd (prepared by esterifying a mixture of 0.8 mol of ethylene glycol and 0.2 mol of propylene glycol with 0.8 mol of maleic anhydride and 0.2 mol of phthalic anhydride and an amount of hydroquinone equal to 0.06 per cent of the weight of the charge by the procedure hereinbefore described) and 15.6 parts of diallyl phthalate was mixed in a Banbury mixer with "Luperco ATC" catalyst (6.24 parts), antimony trioxide (648 parts) and zinc stearate (16 parts).) The composition was then sheeted, granulated and molded as hereinbefore described.

Thus, as the above demonstration shows, articles fabricated from a composition embodying the invention not only are stable at service temperatures but also are self-extinguishing.

It is preferable that a thermosetting composition of the invention contain a substance having at least one polymerizably reactive $CH_2=C<$ group per molecule and having a boiling point not less than 80 degrees C. The water resistance and electrical properties of finished articles produced by polymerization of a composition embodying the invention are improved when the composition contains such a substance. Such a substance is believed to impart better curability to the composition because of its ability to cross link the unsaturated alkyd molecules by copolymerizing with such molecules. The acid groups having chlorinated benzene nuclei, which must be present in a composition of the invention in sufficient amount so that the chlorine content of such groups in the final composition is at least 6 per cent by weight of the organic substances in the composition, may be provided, at least in part, by a substance containing such groups and having at least one polymerizably reactive $CH_2=C<$ group per molecule. It is preferable, however, that the acid radicals having chlorinated benzene nuclei comprise chlorophthalyl radicals containeds in the polymerizable unsaturated alkyd component of a composition of the invention, as is hereinafter further discussed. (The terms "per cent" and "parts" are used herein to mean per cent and parts by weight unless otherwise specified.)

POLYMERIZABLE UNSATURATED ALKYD

The polymerizable unsaturated alkyd in a composition of the invention is an alkyd in which not less than 20 per cent of the acid groups are polymerizably reactive $\Delta^{2,3}$-enedioyl groups. That is, the polymerizable unsaturated alkyd is a polyester prepared by reaction of one or more polyhydric alcohols, and one or more polycarboxylic acids having in the molecule at least one polymerizably reactive $\Delta^{2,3}$-enoyl group, having the structure

Thus, the polymerizable alkyd is one having polymerizably reactive $\Delta^{2,3}$-enoyl groups contained in dioyl groups (connecting polyhydric alcohol residues through ester linkages), which dioyl groups may therefore be defined as $\Delta^{2,3}$-enedioyl groups (e. g., butenedioyl groups such as maleyl or fumaryl groups). The proportion of polyhydric alcohols having more than two hydroxy groups, such as glycerol or pentaerythritol, and the proportion of polycarboxylic acids having more than two carboxy groups, such as citric acid, preferably is small so that in the production of the alkyd there may be maximum esterification of the hydroxy and carboxy groups without attainment of excessive viscosity (i. e., through cross-linking). The alkyd may be an ester of a polycarboxylic acid with any glycol, such as any polymethylene glycol in the series from ethylene glycol to decamethylene glycol, propylene glycol, any butylene glycol, any polyethlene glycol in the series from diethylene glycol to nonaethylene glycol, disecondary glycols such as pentandiol-2,4, dipropylene glycol, and butandiol-2,3, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Also, the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. However, since at least 20 per cent of the acid groups in the alkyd should be polymerizably reactive $\Delta^{2,3}$-enedioyl groups, the proportion of saturated dicarboxylic acid should not be greater than about 80 mol per cent of the acid component in the alkyd, and in the adhesive and molding compositions of the invention should be considerably less than 80 mol per cent as is hereinafter further discussed.

In the practice of the invention the preferred polymerizable unsaturated alkyds are the so-called "linear" alkyds, i. e., those which have very little cross-linking in the alkyd molecules, as evidenced by the fact that such alkyds are soluble in solvents such as acetone. Such alkyds are formed mainly by esterification of a dihydric alcohol and a dibasic acid. Of course, such alkyds are really only "substantially" linear since it is not possible to avoid all cross-linking, at least through the unsaturated bonds in the alkyd molecules. In fact, a linear (or substantially linear) alkyd may be obtained even though in the preparation of such alkyd a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear alkyd for use in the practice of the invention is prepared by carrying out the esterification reason substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the alkyd during the esterification reaction.

The molecular weight of polymerizable unsaturated alkyds for use in the practice of the invention may vary over a wide range, depending upon the initial reacting ingredients and upon the degree of reaction obtained in the preparation of the alkyd. An alkyd used in the practice of the invention may have a molecular weight ranging from as low as about 500 to as high as about 5000, but ordinarily the molecular weights of preferred polymerizable unsaturated alkyds used in the present invention are in the lower portion of the range; for example, the molecular weight of an alkyd prepared from ethylene glycol, maleic anhydride, a chlorophthalic acid and a small amount of propylene glycol usually is within the range from about 700 to about 2000.

In the preparation of the polymerizable unsaturated alkyd resin, any of the usual modifiers such as monobasic acids, monohydric alcohols, and natural resin acids may be added. The proportion of monohydric alcohol or monobasic acid used is never above 10 mol per cent of the acid or alcohol content, more preferably it is not more than about 5 mol per cent, and most preferably is not more than about 2 mol per cent. The reaction of all the ingredients is carried to the point where the product has the desired viscosity. An esterification catalyst such as any organic or inorganic acid or acid salt that is soluble in the reaction medium may be utilized to facilitate the reaction. The reaction is carried out at any elevated temperature which does not cause premature polymerization or gelation. The reaction mixture should contain an inhibitor such as hydroquinone, pyrogallol, tannic acid or any aromatic amine such as aniline or phenylene diamine, etc. to guard against polymerization. The reaction also should be carried out in an inert atmosphere to prevent discoloration. The latter is preferably accomplished by bubbling an inert gas through the mixture. The acid number of the product should be low, as is well understood by the art. Preferred compositions of the invention are those in which the polymerizable unsaturated alkyd is a polyester prepared in accordance with the procedures hereinbefore described by reaction of one or more polyhydric alcohols (as hereinbefore described) with a mixture of polycarboxylic acids of which at least 20 mol per cent is of the class consisting of maleic, fumaric, itaconic, citraconic and mesaconic acid and at least part of the remainder is a saturated aromatic dicarboxylic acid having in its molecule a chlorinated benzene nucleus, e. g., a chloro-substituted phthalic acid. The term "chloro-substituted phthalic acid" is used herein to include mono-, di-, tri- and tetrachlorosubstituted phthalic acids, i. e., mono-, di-, tri- and tetrachloro-substituted ortho-phthalic acid, ortho-phthalic anhydride, isophthalic acid and terephthalic acid. Examples of chloro-substituted phthalic acids include: 4-chlorophthalic acid, 3-chlorophthalic acid, 3,6-dichlorophthalic acid, 3,4,6-trichlorophthalic acid, tetrachlorophthalic acid, 4-chlorophthalic anhydride, 3,6-dichlorophthalic anhydride, 4,5-dichlorophthalic anhydride, tetrachlorophthalic anhydride, 3,4,6-trichlorophthalic anhydride, 4-chloroisophthalic acid, 5-chloroisophthalic acid, tetrachloroisophthalic acid and tetrachloroterephthalic acid.

The most desirable composition of the invention is one in which the minimum chlorine content required to obtain self-extinguishing articles that are stable at service temperatures is derived from chlorophthalyl groups contained in the polymerizable unsaturated alkyd component of the composition. When such a polymerizable unsaturated alkyd is present in a composition of the invention, a monomeric substance having at least one $CH_2=C<$ group per molecule and having a boiling point not less than 80 degrees C. (which is referred to herein for the sake of brevity as a "monomeric substance"), which it is desirable to employ along with the unsaturated alkyd in a composition of the invention, need not contain an acid group having a chlorinated benzene nucleus. That is, so long as the alkyd in a composion of the invention contains acid groups having chlorinated benzene nuclei in sufficient proportion so that the final composition has at least the proper minimum chlorine content, as is hereinafter further discussed, such monomeric substance need not be one of the chlorinated monomeric substances hereinbefore described but may be instead one of the following substances which are copolymerizable with an unsaturated alkyd, of which the diallyl and dimethallyl esters of polybasic acids are preferred: diallyl diphenyl phosphonate, dimethallyl phenylphosphonate, dimethallyl tolylphosphonate, diallyl tolylphosphonate, styrene, o-methyl styrene, methyl methacrylate, methyl acrylate, diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl salicylate), tetra-(allyl glycolate) silicate, and tetra-(allyl lactate) silicate. Of these monomeric substances diallyl phenylphosphonate is most preferred, since this substance has flame-retarding properties, although diallyl phthalate is also a highly desirable monomeric substance for use in the practice of the invention.

FILLERS

When the composition of the invention is a molding composition, various types of fillers may be utilized including an organic filler, an inorganic or mineral filler or combinations of certain inorganic fillers with organic fillers. Organic fillers which may be used include alpha cellulose, shredded paper, chopped cloth, cotton flock, cotton linters, purified wood fibers in finely ground or felted forms, cotton and/or regenerated cellulose as well as resin-treated cellulose (i. e. cellulose impregnated with a thermosetting heterocyclic polyamine formaldehyde resin and then heat-treated to cure). Inorganic or mineral fillers which may be used include fibrous fillers such as glass fibers or asbestos-like silicate fibers (as hereinafter defined) and non-fibrous fillers such as ground glass or clay, kaolin (Georgia clay), and the like, resin-coated kaolin, resin-coated silicate fibers, and various combinations thereof. It is preferred that the filler comprise a mixture of fibrous and non-fibrous inorganic fillers such as mixtures of kaolin (or resin-coated kaolin) and silicate fibers (or resin-coated silicate fibers) or mixtures of glass fibers and kaolin (or resin-coated kaolin). Best results are obtained with mixtures of silicate fibers or glass fibers with melamine-coated kaolin.

The terms "resin-coated cellulose" and "resin-coated kaolin" are used herein to mean cellulose or kaolin particles which have been coated or impregnated with a thermosetting reaction product of formaldehyde and a substance (heterocyclic-polyamine) whose molecule has a plurality of $NH_2$ groups each connected to a carbon atom contained in a heterocyclic ring, the carbon atom being connected by a double bond to an intracyclic nitrogen atom, said amino groups being resin-formingly reactive with formaldehyde. Typical resins of this type are prepared by reacting formaldehyde with guanazole, 1-phenyl guanazole, 4-amino-guanazole, and other 1-substituted guanazoles; pyrimidine; melamine, formoguanamine, acetoguanamine, proprioguanamine, butyroguanamine, benzoguanamine, phenylacetoguanamine, gamma-methyl-gamma-acetyl pimeloguanamine, sebacoguanamine, adipoguanamine, gamma-isopropenyl-gamma-acetylpimeloguanamine, symdiphenyladipo-guanamine, phthaloguanamine, 1,2-bis-2,4-diamino-6-triazinyl naphthalene, gamma-2,4-diamino-6-triazinyl-gamma-phenyl-pimeloguanamine, and other triazines. Melamine is the preferred heterocyclic polyamine.

The heterocyclic-polyamine formaldehyde resin is prepared in solution, in water and/or solvent, and the resulting resin solution, with or without additional water or solvent, applied to the filler either to coat or impregnate it. The resulting damp filler is then dried under conditions favoring conversion of the resin coating to the infusible state. With an inorganic filler such as kaolin or anthrophyllite asbestos the resin coating can constitute 2 to 30% of the final dry product. When the filler is a cellulose material the resin coating can be from 2.5 to 40% of the final dry treated filler.

The inorganic fibrous fillers which may be utilized are any crystalline fibrous silicates of divalent metals and including smaller amounts of other elements such as iron and aluminum. Chrysotile is the hydrous magnesium silicate known commonly as "asbestos." However, in this invention, the preferred fibrous silicates are the anhydrous crystalline forms known generally as pyroboles, including diopside, wollastonite, anthophyllite, tremolite, actinolite, and others descriptively named mountain leather and mountain cork. The pyroboles are further classified as amphiboles and pyroxenes, diopside and wollastonite being pyroxenes and anthophyllite, tremolite and actinolite being amphiboles. The amphiboles, and particularly anthophyllite, are preferred in this invention. The fibers are preferably of a length corresponding to groups No. 6 and No. 7 of the Canadian asbestos classification.

NON-AMPHOTERIC METAL BASES

In the production of the thermosetting polymerizable alkyd compositions of this invention, the incorporation of a base of a non-amphoteric metal of group II not only imparts a substantial improvement in the physical and chemical properties of the composition but also in the water resistance of the articles fabricated therefrom. These metal bases also reduce the stickiness and corrosiveness of the composition and do not impair the self-extinguishing properties of the articles. Amphoteric metal bases are superior in their chemical effects but cannot be used in self-extinguishing alkyd compositions. Suitable non-amphoteric metal bases include the oxides, hydroxides, borates, carbonates, and alcoholates of the non-amphoteric metals of group II such as magnesium, calcium, strontium and barium. The carbonates of the alkaline earth metals, and particularly those of barium, are preferred.

The metal base may be incorporated in the composition in the same manner as are the fillers, simply by adding the finely divided material to the alkyd as a separate step or at the same time as the fillers mentioned above. The proportion of metal base may range from 2 to 20% of the total filler content, although in general it is desired to utilize a slight excess over that required to neutralize the alkyd. Since the metal base is inactive and insoluble, it is considered to be part of the filler and the total proportions of metal base and filler should be within the limits for fillers hereinbefore described.

PREPARATION OF THERMOSETTING COMPOSITION

The thermosetting compositions of the invention that produce self-extinguishing articles which are stable at service temperatures include casting, adhesive and molding compositions.

A molding composition of the invention comprises antimony trioxide, a filler, and a binder comprising a polymerizable unsaturated alkyd as hereinbefore defined.

The minimum proportion of antimony trioxide in a composition of the invention is that which is equivalent to the proportion of HCl that is liberated from the acid radicals having chlorinated benzene nuclei when articles produced from a composition of the invention are subjected to a flame. The maximum proportion of antimony trioxide is limited primarily by economic considerations and also by the fact that too large a proportion may undesirably increase the molded density of articles produced from the present compositions. In general, the proportion of antimony trioxide in a composition of the invention may be as little as 1 per cent of the composition and may be as great as three times the per cent of chlorine in the composition. The antimony trioxide in a molding composition may be considered to be part of the filler, and in computing the total amount of filler used, the amount of antimony trioxide is added to the amount of other filler used so that the total proportion of filler used in a molding composition of the invention is within the range hereinafter described.

In the production of molding compositions of the invention the mixing of the filler with the binder may be carried out by any of the known procedures. If the binder is very viscous, it may be necessary to incorporate the filler in the binder on a heated two-roll (differential speed) rubber mill, or it may be desirable to heat the binder in order to reduce the viscosity sufficiently to permit the use of other mixing procedures. Ordinarily, the viscosity of the binder is such that kneading or equivalent mixing procedures may be used satisfactorily. In some cases it may be desirable to dilute the binder with a solvent in order to facilitate mixing with the filler. However, it is preferable that any solvent employed in a composition of the invention be not so volatile that voids are produced when the composition is molded at ordinary molding temperatures, i. e., approximately 250 to 300 degrees F.

In fact, a composition of the invention should not comprise any substance that is sufficiently volatile to produce voids at the temperature at which the composition is fabricated. Thus, a monomeric substance used in a composition of the invention has a boiling point not less than 80 degrees C. so that a composition of the invention may be cast or molded at temperatures at least as high as about 180 degrees F. without danger that volatile substances will be released during fabrication to cause voids in the finished article. One of the chief advantages of the present invention is, of course, that compositions of the invention produce articles which remain stable and durable under severe conditions. Thus, the production of casting or molding compositions that produce fabricated articles having voids or other defects is inconsistent with the practice of the invention.

The proportion of filler in a molding composition of the invention may range from a very small proportion such as about 5 per cent to a very high proportion such as about 85 per cent of the composition, but the preferred proportions vary in accordance with the specific fillers employed.

Ordinarily, when the filler in a molding composition of the invention is a fibrous inorganic filler (i. e., a fibrous silicate filler or a resin-coated fibrous silicate filler or a glass fiber filler), it may be from about 5 to about 75 per cent of the composition, and preferably is from about 60 to about 70 per cent of the composition.

When the filler in a molding composition of the invention is a non-fibrous inorganic filler (i. e., kaolin or resin-coated kaolin particles), it may be from about 5 to about 85 per cent of the composition. It is preferred, however, that a non-fibrous inorganic filler be from about 60 to about 75 per cent of the composition.

When the filler in a molding composition of the invention is an organic filler (i. e., cellulose, as hereinbefore described), it may be from about 5 per cent of the composition to about 75 per cent of the composition, but preferably is from about 60 to about 65 per cent of the composition.

When the filler in a molding composition of the invention comprises a mixture of fibrous and non-fibrous inorganic fillers, it is preferred that the proportion of filler be from about 60 per cent to about 70 per cent of the composition. At least an appreciable amount of both the fibrous filler and the non-fibrous filler is used in such a mixture in order to obtain the benefit of the improvements which are imparted by each type of filler. As a rule, the proportion of non-fibrous filler to fibrous filler in the mixture may range from the minimum proportion at which the effect of the non-fibrous filler is noticeable (i. e., about 1:100) to the maximum proportion at which the effect of the fibrous filler is noticeable (i. e., about 6:1), the preferred proportions being in the upper portion of the range for economic reasons. The optimum results are obtained at a ratio of non-fibrous to fibrous filler ranging from about 1:1 to about 2:1.

When the filler comprises a mixture of a non-fibrous inorganic filler and cellulose, the proportion of non-fibrous filler to cellulose may range from about 4:1 to about 1:4, the total proportion of such filler mixture in a composition of the invention preferably being from about 55 per cent to about 65 per cent of the composition.

When the polymerizable unsaturated alkyd in a composition of the invention contains a proportion of chlorophthalyl radicals whose chlorine content is at least the minimum proportion required to produce self-extinguishing molded articles, the polymerizable unsaturated alkyd alone may be the binder in the composition. However, it is preferable that the binder in a composition of the invention consist of one or more of such polymerizable unsaturated alkyds and one or more monomeric substances (as hereinbefore defined), in order that the composition may produce articles having superior properties. When, on the other hand, the polymerizable unsaturated alkyd in a composition of the invention does not contain chlorophthalyl radicals or contains a proportion of chlorophthalyl radicals that is too low for the composition to have the proper chlorine content (as hereinafter discussed), the binder in such a composition must comprise in addition to the polymerizable unsaturated alkyd one or more chlorinated monomeric substances from which may be derived acid radicals having chlorinated benzene nuclei in sufficient proportion so that the composition has at least the minimum chlorine content required in the practice of the invention.

In the practice of the invention a solution comprising one or more polymerizable unsaturated alkyds and one or more polymerizable monomeric substances is particularly advantageous, because the alkyd has desirable physical properties and hardens very rapidly, whereas the presence of the monomeric compound causes the polymerized product to be much more water resistant and insoluble. Moreover, the combination (solution) of the alkyd and the monomeric compound usually polymerizes much more rapidly than either of such substances alone. Such a solution usually contains about 5 to about 35 per cent of the polymerizable monomeric substance and about 95 to about 65 per cent of the polymerizable alkyd.

The proportion of acid groups having chlorinated benzene nuclei in a composition of the invention must be such that their chlorine content is at least 6 per cent by weight of the organic substances in the composition. The organic substances in a composition of the invention include not only the binder but also any organic fillers, i. e., cellulose fillers. The chlorine content of a composition of the invention which produces self-extinguishing articles is necessarily dependent on the cellulose content of the composition since cellulose is combustible and requires additional flame retardant. In general, it is preferable that the chlorine content of the chlorinated benzene nuclei contained in acid groups in a composition of the invention be at least 10 per cent of the organic substances in the composition.

The maximum chlorine content of the chlorinated benzene nuclei contained in acid groups in a composition of the invention is that above which any further increase in self-extinguishing properties is not sufficiently great to make the use of a higher proportion of chlorine donor economically feasible. In general, the maximum chlorine content is about 20 per cent of the organic substances in the composition, and ordinarily there is no advantage in using a chlorine content higher than about 15 per cent of the organic substances in the composition. However, the maximum proportion of chlorine that may be derived from chlorophthalyl groups contained in the unsaturated alkyd component of a composition of the invention is not limited merely by economic considerations.

As hereinbefore stated, the preferred compositions of the invention are those in which the alkyd contains chlorophthalyl groups whose chlorine content is at least 6 per cent by weight of the organic substances in the composition. At least 20 per cent of the acid groups in the polymerizable unsaturated alkyd component of a composition of the invention are polymerizably reactive $\Delta^{2,3}$-enedioyl groups. Thus, the proportion of chlorophthalyl groups in the unsaturated alkyd component of a composition of the invention cannot be higher than 80 per cent of the acid groups. In fact, in adhesive compositions of the invention, it is desirable that not more than about 50 per cent of the acid groups contained in the unsaturated alkyd be chlorophthalyl groups, and in molding compositions of the invention it is desirable that not more than about 40 per cent of the acid groups contained in the unsaturated alkyd be chlorophthalyl groups in order that such compositions may be fabricated into articles having satisfactory properties. For example, articles molded from a composition in which the proportion of chlorophthalyl groups in the unsaturated alkyd is higher than about 40 per cent of the acid groups tend to be soft and cheesy, particularly when hot, so that such molded articles do not have satisfactory properties. Thus, when the chlorine content of a molding composition of the invention is derived solely from the unsaturated alkyd component, the maximum chlorine content cannot be higher than the chlorine content in an alkyd in which 40 per cent of the acid groups are chlorophthalyl groups.

Of course, when a molding composition is desired having a high chlorine content derived from chlorophthalyl radicals in the unsaturated alkyd, it may be necessary that the chlorine content of the chlorophthalyl radicals be high. In other words, the alkyd may be a polyester of a polyhydric alcohol with a mixture of polycarboxylic acids comprising 60 mol per cent of maleic, fumaric, itaconic, citraconic or mesaconic acid and 40 mol per cent of a highly chlorinated phthalic acid such as tetrachlorophthalic acid. When the maximum chlorine content is desired, and the proportion of chlorophthalic acid employed in the preparation of the unsaturated alkyd is not great enough to yield such chlorine content (e. g., 40 mol per cent of monochlorophthalic acid in the alkyd in a molding composition of the invention ordinarily would not give a chlorine content that approaches the maximum chlorine content of 20 per cent of the organic substances in the composition), additional chlorine content may be provided by the use of a chlorinated monomer such as diallyl chlorophenylphosphonate.

Casting or adhesive compositions embodying the invention may contain as little as 1 per cent of filler (other than antimony trioxide), and the maximum per cent of filler in such compositions is simply that amount which may be added without rendering the compositions too viscous to handle. For example, in adhesive compositions the proportion of a cellulose filler to the alkyd may range from as low as about 1:100 to as high as about 1:1, the preferred proportions being from about 1:5 to about 1:2. In the production of casting or adhesive compositions embodying the invention, the mixing of the filler with the polymerizable alkyd may be carried out by any of the known methods, for example, by heating the alkyd to reduce its viscosity, thus permitting the use of the ordinary mixing methods hereinbefore described for the preparation of a molding composition of the invention.

Since the polymerizable alkyd in a composition of the invention is fusible and plastic at relatively low temperatures, it is possible to adjust the amounts of catalysts and inhibiting agents so that the hardening at such temperatures takes place at a reasonable rate to allow ample opportunity for shaping and fabricating of the composition. In this manner molding compositions may be produced which are fast curing, gas free and adapted to complicated moldings (e. g., clock cases).

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluyl peroxide, p-bromobenzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide, or a mixture of substances, may be used as the curing catalyst. The proportion of curing catalyst used in the practice of the invention is simply the proportion that causes the composition to polymerize at the desired rate, and as the term "catalyst" implies, such proportion is the usual catalytic amount, i. e., ranging from about 0.01 per cent to about 5 per cent of the composition. The preferred proportion of curing catalyst varies with the different catalysts, and the amount of any particular curing catalyst required to produce a given rate of hardening may vary also with variations in the nature of the polymerizable composition. For example, an alkyd prepared from maleic anhydride and diethylene glycol, in a molding composition of the invention containing about 3 per cent of benzoyl peroxide, may be cured at approximately the same rate as a molding composition, containing a similar alkyd prepared from fumaric acid and diethylene glycol, in which the proportion of benzoyl peroxide is about 0.5 per cent.

Compositions of the invention may contain, along with a catalyst for the polymerization of the unsaturated alkyd, any of the usual additives such as molding lubricants, plasticizers and coloring matter, the amount used in the case of each of such additives being the usual amount consistent with its particular function in the composition.

Example 1

(a) A polymerizable binder, consisting of a polymerizable unsaturated alkyd (1168 parts prepared by esterifying 0.85 mol of ethylene glycol and 0.2 mol of propylene glycol with 0.8 mol of maleic anhydride and 0.2 mol of dichlorophthalic anhydride (a mixture of isomers) in the presence of an amount of hydroquinone equal to 0.06 per cent of the charge by the procedure hereinbefore described for the preparation of composition A) and diallyl phthalate (130 parts), is mixed in a Banbury mixer with a catalyst (52 parts of "Luperco ATC"), kaolin (1575 parts), anthophyllite fibers (1575 parts), a lubricant (100 parts of zinc stearate), a base of a non-amphoteric metal (250 parts of barium carbonate) and antimony trioxide (250 parts). The mixing is continued until a soft, homogeneous dough is obtained. The material is then passed through warm rubber rolls to form sheets of a thickness of approximately ⅛ inch. The sheets are allowed to solidify fully while at a temperature between 80 and 90° F. and are then granulated in a high speed cutter to a maximum particle diameter of about ⅛ inch. Articles molded from this composition of the invention show no discoloration upon being baked in an oven at 150° C. for 30 days, and yet are self-extinguishing when tested for flammability by the procedure hereinbefore described. (The test piece stops burning within 45 seconds upon the first ignition and within 65 seconds upon the second ignition.)

(b) A composition of the invention is prepared by the procedure described in (a) except that in place of the dichlorophthalic anhydride used in the preparation of the alkyd, an equimolar proportion of tetrachlorophthalic anhydride is used, and in place of the diallyl phthalate diallyl phenyl phosphonate (130 parts) is used. Articles molded from this composition are self-extinguishing when tested for flammability by the procedure hereinbefore described. (The test piece stops burning within 2 seconds upon the first ignition as soon as the flame is removed upon the second ignition.)

Example 2

A polymerizable binder, consisting of a polymerizable unsaturated alkyd (183 parts prepared by esterifying 0.8 mol of ethylene glycol and 0.2 mol of propylene glycol with 0.8 mol of maleic anhydride and 0.2 mol of tetrachlorophthalic anhydride in the presence of an amount of hydroquinone equal to 0.06 per cent of the charge by the procedure hereinbefore described) and diallyl phthalate (24.7 parts), is mixed in a Banbury mixer with a catalyst (8.3 parts of "Luperco ATC"), a filler consisting of kaolin (252 parts) and anthophyllite fibers (252 parts), a lubricant (16 parts of zinc stearate), a metal base (40 parts of barium carbonate) and antimony trioxide (40 parts). The mixing is continued until a soft, homogeneous dough is obtained. The material is then passed through warm rubber rolls to form sheets of a thickness of approximately ⅛ inch. The sheets are allowed to solidify fully while at a temperature between 80 and 90° F. and are then granulated in a high speed cutter to a maximum particle diameter of about ⅛ inch. Articles molded from this composition of the invention are self-extinguishing when tested for flammability by the procedure hereinbefore described. (The test piece stops burning within 43 seconds upon the first ignition and within 26 seconds upon the second ignition.)

Example 3

Resin-coated kaolin particles are prepared in accordance with the following procedure: A reaction mixture of a heterocyclic polyamine (9 parts of melamine), formalin (17.4 parts of a 37 per cent commercial aqueous formaldehyde solution) and water (206.6 parts) is heated to 80° C. and held at that temperature for ten minutes, the pH being adjusted to 6.8 to 7.0 with dilute lactic acid as soon as a clear solution is obtained. The resulting resin solution is then cooled to 60° C. before stirring in kaolin (120 parts) to make a relatively thin slurry. This slurry is then spray dried in a Bowen drier, described in U. S. Patent No. 1,946,566 at an air inlet temperature of 500 to 600° F. and an air outlet temperature of about 275° F. to obtain finely-divided resin-coated kaolin particles.

Resin-coated anthophyllite fibers are prepared in accordance with the following procedure: A reaction mixture of melamine (109 parts), formalin (210 parts) and water (400 parts) is heated to a temperature of 80° C. As soon as a clear solution is formed, the pH is adjusted to 6.7 by adding lactic acid (0.7 cc. of a 10 per cent aqueous solution), and the reaction is continued for a total time of ten minutes at 80° C. The resin solution is then cooled to 60° C. and diluted with water (3200 grams). The resulting dilute resin solution is then absorbed on anthophyllite (1638 grams) in a Hobart mixer. After drying on trays at 160 degrees F. for approximately 48 hours, the resin-coated filler is placed on a standard 12 mesh screen, which is shaken to remove all particles fine enough to pass through the screen, the residue being used along with the resin-coated kaolin particles in a composition of the invention prepared as follows:

A composition of the invention is prepared by the procedure described in Example 2 except that the filler consists of 252 parts of the resin-coated kaolin particles and 252 parts of the resin-coated anthophyllite fibers prepared as described above. Articles molded from this composition of the invention are self-extinguishing when tested for flammability by the procedure hereinbefore described. (The test piece stops burning as soon as the flame is removed upon each ignition.)

Example 4

A composition of the invention is prepared by the procedure described in Example 2 except that (1) the filler consists of 2820 parts of kaolin and 600 parts of alpha cellulose; (2) the proportions of the other ingredients are as follows: polymerizable unsaturated alkyd, 1370 parts; diallyl phthalate, 533 parts; "Luperco ATC" catalyst, 76 parts; antimony trioxide, 300 parts; barium carbonate, 300 parts; and zinc stearate, 120 parts; and (3) the material is formed into sheets of a thickness of approximately ⅛ inch but is not granulated. Articles molded from this composition of the invention are self-extinguishing when tested for flammability by the procedure hereinbefore described. (The test piece stops burning within 90 seconds upon ignition.)

Example 5

A composition of the invention is prepared by the procedure described in Example 4 except that the filler consists of 329 parts of resin-coated kaolin particles (prepared as described in Example 3) and 70 parts of alpha cellulose, and the proportions of the other ingredients are as follows: polymerizable unsaturated alkyd, 160 parts; diallyl phthalate, 62 parts; "Luperco ATC" catalyst, 8.9 parts; antimony trioxide, 35 parts; barium carbonate, 35 parts; and zinc stearate, 14 parts. Articles molded from this composition are self-extinguishing when tested for flammability by the procedure hereinbefore described. (The test piece stops burning within 45 seconds upon the first ignition and within 30 seconds upon the second ignition.)

Example 6

A composition of the invention is prepared by the procedure described in Example 4 except that the filler consists of 280 parts of resin-coated kaolin particles (prepared as described in Example 3) and 140 parts of anthophyllite fibers, and the proportions of the other ingredients are as follows: polymerizable unsaturated alkyd, 145.4 parts; diallyl phthalate, 56.6 parts; "Luperco ATC" catalyst, 8.1 parts; antimony trioxide, 35 parts; barium carbonate, 35 parts; and zinc stearate, 14 parts. Articles molded from this composition are self-extinguishing when tested for flammability by the procedure hereinbefore described. (The test piece stops burning with 13 seconds upon the first ignition and within 30 seconds upon the second ignition.)

Example 7

A composition of the invention is prepared by the procedure described in Example 2 except that the filler consists of 84 parts of kaolin, 98 parts of alpha cellulose, 105 parts of glass fibers and 98 parts of resin-treated cellulose, and the proportions of the other ingredients are as follows: polymerizable unsaturated alkyd, 212 parts; diallyl phthalate, 23.6 parts; "Luperco ATC" catalyst, 9.4 parts; antimony trioxide, 35 parts; barium carbonate, 35 parts; and zinc stearate, 14 parts. Articles molded from this composition are self-extinguishing when tested for flammability by the procedure hereinbefore described. (The test piece stops burning within 5 seconds upon the first ignition and within 8 seconds upon the second ignition.) The resin-treated cellulose filler comprises about 33 to 50 per cent alpha cellulose and about 50 to 67 per cent urea-formaldehyde reaction product and is prepared by impregnating the alpha cellulose with a urea-formaldehyde resin solution (obtained by holding a solution of 2 mols of urea in formalin, containing 3 mols of formaldehyde, at a temperature of 30 degrees C. and at a pH of about 7 for six hours), thoroughly drying the impregnated material at about 101° C., and then grinding in a ball mill to produce a homogeneous powder.

Example 8

A composition of the invention is prepared by the procedure described in Example 4 except that (1) the filler consists of 120 parts of kaolin and 360 parts of glass fibers; (2) the proportions of the other ingredients are as follows: polymerizable unsaturated alkyd, 344 parts; diallyl phthalate, 38 parts; "Luperco ATC" catalyst, 15.4 parts; antimony trioxide, 70 parts; barium carbonate, 50 parts; and zinc stearate, 20 parts; and (3) the material is not sheeted but is left in fluffy form. Articles molded from this composition are self-extinguishing when tested for flammability by the procedure hereinbefore described. (The test piece stops burning as soon as the flame is removed upon the first ignition and within 8 seconds after the flame is removed upon the second ignition.)

Having described the invention I claim:

1. A thermosetting composition that produces self-extinguishing articles which are stable at service temperatures comprising (1) a polymerizable alkyd resin binder containing chemically-combined chlorinated saturated aromatic dicarboxylic acid groups containing chlorinated benzene nuclei whose chlorine content is at least 6% by weight of the organic substances in the composition, said binder comprising a polymerizable unsaturated alkyd resin wherein not less than 20% of the polycarboxylic acid groups are dicarboxy alkene groups, and (2) antimony trioxide in amount at least equivalent to the proportion of chlorine liberated from said chlorinated benzene nuclei upon combustion.

2. A composition as claimed in claim 1 that consists only of substances that are insufficiently volatile to produce voids when the composition is fabricated at 180° F. and in which the chlorinated benzene nuclei are chlorophthalyl groups.

3. A composition as claimed in claim 2 that includes a base of a non-amphoteric metal of group II.

4. A composition as claimed in claim 2 wherein the chlorinated benzene nuclei are chlorophthalyl groups forming a part of the alkyd resin molecule and which in addition contains barium carbonate.

5. A thermosetting composition that produces self-extinguishing articles which are stable at service temperatures comprising (1) as a polymerizable binder, a polymerizable unsaturated alkyd resin containing, as part of its molecule, chlorophthalyl groups whose chlorine content is at least 6% by weight of the organic substances in the composition, said alkyd resin also having in its structure not less than 20% of its polycarboxylic acid groups as dicarboxy alkene groups, and (2) antimony trioxide in an amount at least equivalent to the amount of chlorine liberated from said chlorophthalyl groups upon combustion of said composition.

6. A thermosetting composition that produces self-extinguishing molded articles that are stable at service temperatures, comprising (1) a polymerizable alkyd resin binder containing chemically-combined chlorinated saturated aromatic dicarboxylic acid groups containing chlorinated benzene nuclei whose chlorine content is at least 6% by weight of the organic substances in said composition, said binder comprising (a) a polymerizable unsaturated alkyd resin wherein not less than 60% of the polycarboxylic acid groups are dicarboxy alkene groups and (b) as a comonomeric substance, an ester selected from the class consisting of diallyl and dimethallyl esters of polybasic acids, which ester is copoylmerizable with said alkyd resin, (2) a filler, and (3) antimony trioxide in amount at least equivalent to the amount of chlorine liberated by said composition on combustion, the total amount of said filler and said antimony trioxide being from 5 to 85% by weight of the composition.

7. A composition as claimed in claim 1 wherein the alkyd resin contains as a part of its chemical structure, maleic acid groups and dichlorophthalyl groups.

8. A composition as claimed in claim 1 wherein the alkyd resin contains as a part of its chemical structure maleic acid groups and tetrachlorophthalyl groups.

9. A thermosetting molding composition as claimed in claim 6 in which the alkyd resin contains chlorophthalyl groups, the copolymerizable ester is a diallyl ester, the filler is kaolin and in which the total of kaolin and antimony trioxide is from 60 to 75% by weight of the composition.

10. A thermosetting molding composition as claimed in claim 6 in which the binder consists of (1) an alkyd resin containing maleic acid groups and chlorophthalyl groups and (2) as a comonomeric substance, diallyl phthalate, in which the filler is a mixture of glass fibers and of kaolin particles coated with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom, and in which the total of said mixed filler and said antimony trioxide is from 60 to 75% by weight of the total composition.

11. A thermosetting molding composition as claimed in claim 6 in which the binder consists of (a) an alkyd resin containing maleic acid groups and chlorophthalyl groups and (b) diallyl phthalate, in which the filler is a mixture of anthophyllite fibers and melamine-formaldehyde resin coated kaolin particles, and the total of said mixed filler and antimony trioxide is from 60 to 75% by weight of the total composition.

12. A thermosetting molding composition as claimed in claim 6 in which the binder consists of (a) an alykd resin containing chlorophthalyl groups and (b) diallyl phenyl phosphonate and the filler is a mixture of kaolin and anthophyllite fibers.

References Cited in the file of this patent

UNITED STATES PATENTS

| Number | Name | Date |
| --- | --- | --- |
| 1,885,025 | Patterson | Oct. 25, 1932 |
| 2,486,664 | Marling | Nov. 1, 1949 |
| 2,529,512 | Ott | Nov. 14, 1950 |
| 2,537,520 | Eger | Jan. 9, 1951 |
| 2,584,315 | Agnew | Feb. 5, 1952 |